United States Patent [19]

Fujisawa

[11] Patent Number: 4,636,100

[45] Date of Patent: Jan. 13, 1987

[54] PAPER FEED MECHANISM FOR RECORDING APPARATUS

[75] Inventor: Kyuichi Fujisawa, Tonan, Japan

[73] Assignee: Alps Electric Co., Ltd., Japan

[21] Appl. No.: 660,030

[22] Filed: Oct. 12, 1984

[30] Foreign Application Priority Data

Oct. 14, 1983 [JP] Japan .......................... 58-159181[U]

[51] Int. Cl.⁴ .......................... B41J 11/14; G03B 1/24

[52] U.S. Cl. .......................... 400/662; 400/616.3; 226/86; 226/194

[58] Field of Search .......................... 400/659, 662, 661.3, 400/616.3; 226/53, 80, 82, 84, 85, 86, 193, 194

[56] References Cited

U.S. PATENT DOCUMENTS

| | | | |
|---|---|---|---|
| 2,513,084 | 6/1950 | Fairbanks | 226/84 |
| 3,310,790 | 3/1967 | Nakamichi | 226/82 X |
| 3,435,737 | 4/1969 | Sarka | 226/80 X |
| 3,857,471 | 12/1974 | Hoffman et al. | 400/616.3 X |
| 3,958,873 | 5/1976 | Mueller | 226/82 X |
| 4,197,024 | 4/1980 | Huntoon | 400/662 X |
| 4,358,039 | 11/1982 | Buzzell | 400/616.3 X |
| 4,376,589 | 3/1983 | Avallanet et al. | 400/616.3 X |

FOREIGN PATENT DOCUMENTS

| | | | |
|---|---|---|---|
| 56955 | 8/1982 | European Pat. Off. | 400/616.3 |
| 2800757 | 7/1979 | Fed. Rep. of Germany | 400/616.3 |
| 981119 | 5/1951 | France | 400/616.3 |

*Primary Examiner*—Edgar S. Burr
*Assistant Examiner*—James R. McDaniel
*Attorney, Agent, or Firm*—Guy W. Shoup

[57] ABSTRACT

A paper feed mechanism for use in a recording apparatus includes a rotatable platen, a printing unit disposed in confronting relation to the platen and movable axially of the platen for printing the recording paper against the platen, a plurality of teeth disposed at an end of the platen and arranged circumferentially of the platen, a resilient member disposed adjacent to the teeth and having a diameter greater than that of the platen, and a paper presser roller disposed in confronting relation to the platen and movable retractably toward the platen for pressing recording paper against the platen with the teeth in biting engagement with the recording paper, the paper presser roller having a portion for pressing the recording paper against the resilient member.

5 Claims, 9 Drawing Figures

PAPER FEED MECHANISM FOR RECORDING APPARATUS

BACKGROUND OF THE INVENTION

The present invention relates to a recording apparatus such as a pen recorder, and more particularly to a paper feed mechanism for feeding a sheet of recording paper by reliably gripping the same.

There have been known several types of paper feed mechanisms for use in recording apparatus. In one paper feed mechanism, a sheet of recording paper is fed in frictional engagement with a platen. However, the recording paper tends to slip with respect to the platen especially when the platen is rotated through a large angle to draw a graphic pattern on the recording paper. Another paper feed mechanism includes teeth on a platen for biting engagement with a sheet of recording paper for positively feeding the recording paper. A complex procedure is however required to enable the recording paper to be inserted reliably between the platen and paper presser rollers pressed against the platen.

SUMMARY OF THE INVENTION

With the prior difficulties in view, it is an object of the present invention to provide a paper feed mechanism for a recording apparatus which is capable of easily loading a sheet of recording paper between a toothed platen and paper presser rollers and of easily separating the recording paper off the platen when the paper presser rollers are brought out of engagement with the platen.

According to the present invention, a paper feed mechanism for use in a recording apparatus includes a rotatable platen, a printing unit disposed in confronting relation to the platen and movable axially of the platen for printing on the recording paper against the platen, a plurality of teeth disposed at an end of the platen and arranged circuaferentially of the platen, a resilient member disposed adjacent to the teeth and having a diameter greater than that of the platen, and a paper presser roller disposed in confronting relation to the platen and movable retractably toward the platen for pressing recording paper against the platen with the teeth in biting engagement with the recording paper, the paper presser roller having a portion for pressing the recording paper against the resilient member.

The teeth are concealed by the resilient member axially of the platen, so that a leading edge of the recording paper can smoothly be inserted between the platen and the paper presser roller without interference with the teeth. When the paper presser roller is displaced away from the platen, the recording paper is disengaged from the teeth under the resiliency of the resilient member.

The above and other objects, features and advantages of the present invention will become more apparent from the following description when taken in conjunciton with the accompanying drawings in which preferred embodiments of the present invention are shown by way of illustrative example.

DETAILED DESCRIPTION

Figure 1:
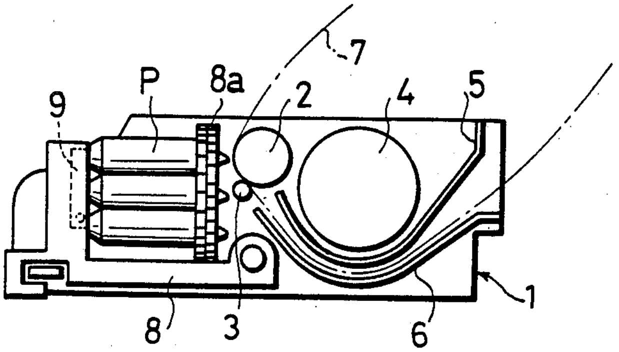
FIG. 1 is a schematic side elevational view of a pen recorder having a conventional paper feed mechanism.

FIG. 1 schematically shows a pen recorder as an example of a recording apparatus. The pen recorder includes a rotatary platen 2 mounted on a base 1 and drivable for rotation by a stepping motor 4. A paper presser roller 3 is pressed against the platen 2 with a sheet of recording paper 7 gripped therebetween and being fed out in a vertical direction as shown. The recording paper 7 is guided between upper and lower guides 5, 6 while being supplied to a position below the platen 2. A carriage 8 with a plurality of pens P mounted thereon is disposed on the base 1 and movable axially of the platen 2. One of the pens P is selected at a time and set into a position confronting the platen 2 in response to rotation of a pen holder 8*a*.

In operation, the platen 2 is turned reciprocally about its own axis to feed the recording paper 7 vertically as shown, and the pens P reciprocally move with the carriage 8 in a direction normal to the sheet of FIG. 1. The selected pen P is pushed by a hammer 9 on the carriage 8 in timed relation to the movements of the platen 2 and the carriage 8 for enabling the pen P to record a desired character, a symbol, or another desired pattern on the recording paper 7.

With the pen recorder of the type described, it is necessary to feed the recording paper 7 for a long interval by rotating the platen 2 through a large angle when drawing a graphic pattern. Since the recording paper 7 has conventionally been fed along through frictional engagement between the recording paper 7 and the platen 2, the recording paper 7 has been likely to be displaced out of position to cause a drawn pattern to suffer interruptions or other distortions due to slippage between the recording paper 7 and the platen 2.

Figure 2:
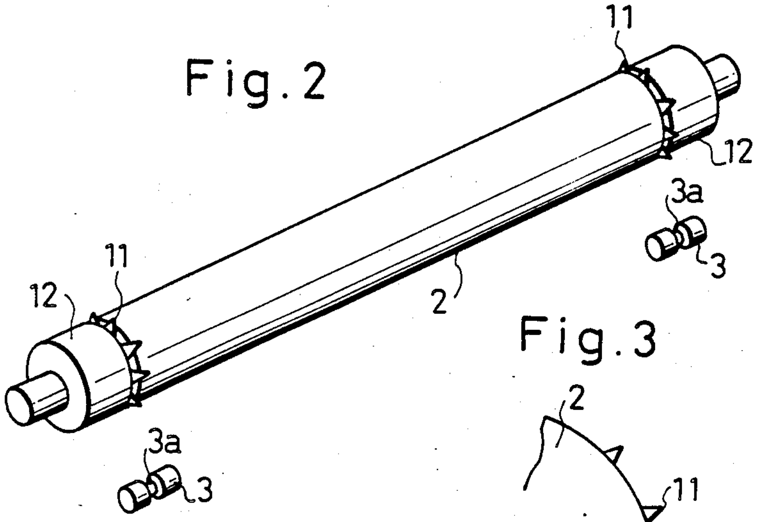
FIG. 2 is a perspective view of another conventional paper feed mechanism.

To cope with the above problem, there has been devised a paper feed mechanism as shown in FIG. 2, which has been disclosed in Japanese Patent Application No. 57-079668 filed by the same applicant. The disclosed paper feed mechanism includes teeth 11 on opposite ends of a platen 2, the teeth 11 being arranged circumferentially of the platen 2. The teeth 11 are defined on the peripheries of circular metal plates which are sandwiched in position between the platen 2 and cylindrical pressers 12 having the same diameter as that of the platen 2. The paper feed mechanism also has paper presser rollers 3 having grooves 3*a* in which the teeth 11 can enter when the paper feed rollers 3 are pressed against the platen 2. A sheet of recording paper has marginal edges gripped between the platen 2 and the paper presser rollers 3. Since the teeth 11 bite into the marginal edges of the recording paper as thus gripped, the recording paper and the platen 2 move in unison so that the recording paper will be fed along in complete synchronism with rotation of the platen 2. The paper feed mechanism shown in FIG. 2 eliminates any undesirable slippage between the platen 2 and the recording paper 7, ensuring that characters and graphic patterns will be recorded accurately.

Figure 3:
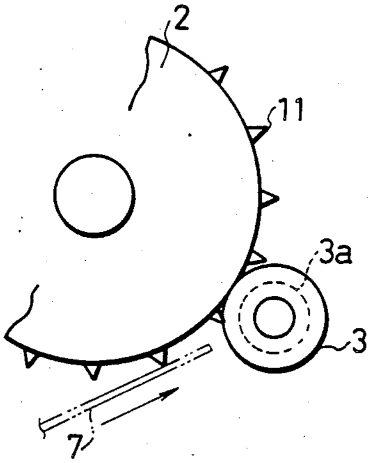
FIGS. 3 and 4 are fragmentary views of the paper feed mechanism of FIG. 2 illustrative of prior problems.

However, the paper feed mechanism still suffers the following problems: as shown in FIG. 3, the teeth 10 project radially outwardly from the circumferential surface of the platen 2. When the recording paper 7 is fed along while the paper presser rollers 3 are pressed against the platen 2, the leading edge of the recording paper 7 abuts against the teeth 11 and sometimes fails to be inserted smoothly between the platen 2 and the paper presser rollers 3. For reliable insertion of the recording paper 7, it is necessary to displace the paper presser rollers 3 away from the platen 2, position the recording paper 7 accurately, and then press the paper presser rollers 3 against the platen 2, a procedure which is quite complicated. Where separate sheets instead of roll paper are used as the recording paper 7, paper insertion is highly inconvenient to carry out since the recording paper 7 has to be set many times.

Figure 4:
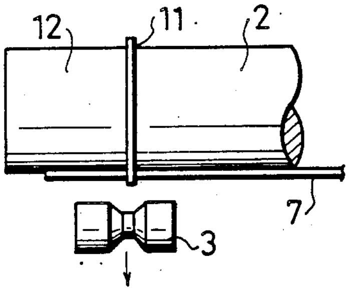

In case the paper feed mechanism is incorporated in a typewriter, the recording paper 7 is first inserted, and then positioned while the paper presser rollers 3 are spaced from the platen 2. Since however the teeth 11 remain in biting relation to the recording paper 7 when the paper presser rollers 3 are disengaged from the platen 2, as shown in FIG. 4, the operator is required to manually peel the recording paper off the teeth 11. This also results in a complex paper insertion procedure.

The present invention will now be described with reference to FIGS. 5 through 9.

Figure 5:
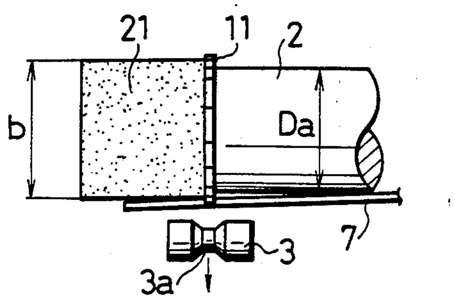
FIGS. 5 and 6 are fragmentary plan views of a paper feed mechanism according to the present invention, showing the manner in which a sheet of recording paper is gripped between a platen and a paper presser roller.
Figure 6:
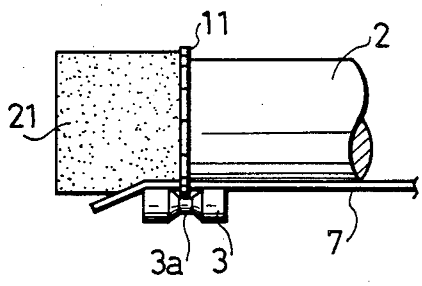

FIGS. 5 and 6 illustrate a paper feed mechanism according to an embodiment of the present invention.

A platen 2 is disposed in a recording apparatus such as a pen recorder as shown in FIG. 1. The platen 2 is driven to rotate in both directions about its own axis by a stepping motor which is the same as the stepping motor 4 as shown in FIG. 1. The platen 2 is in the form of a drum made of hard rubber having a diameter of Da.

The platen 2 has on its opposite ends (only one shown) teeth 11 defined on the peripheral edge of a circular metal plate, the teeth 11 having sharp biting edges. At each end of the platen 2, a reslient member 21 is disposed outside of the toothed metal plate. The resilient member 21 is made of a material which is easily resiliently deformable such as spongy soft rubber. The resilient member 21 is in the form of a drum having a diameter b greater than the diameter Da of the platen 2. The diameter b should preferably be equal to or slightly larger than the outside diameter of the teeth 11. The platen 2, the metal plates having the teeth 11, and the resilient members 21 are fixed to a shaft 2*a* (FIG. 7) for co-rotation in response to rotation of the shaft 2*a* driven by the motor. Paper presser rollers 3 are disposed in confronting relation to the opposite ends of the platen 2, the paper presser rollers 3 being of the conventional design. More specifically, the paper presser rollers 3 are attached to a release lever (not shown) and are normally urged by a spring to be pressed against the platen 2. The paper presser rollers 3 can be brought out of engagement with the platen 2 by actuating the release lever.

Figure 7:
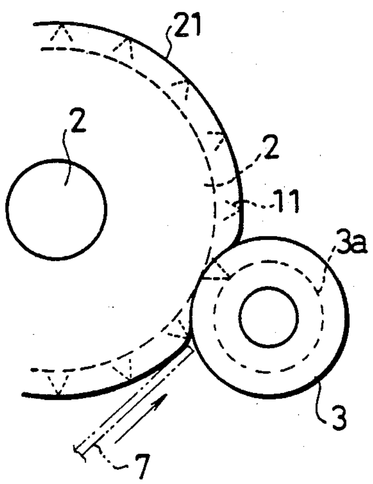
FIG. 7 is a side elevational view of the paper feed mechanism of FIGS. 5 and 6.

The paper feed mechanism of the foregoing construction will operate as follows:

When the paper presser rollers 3 are pressed against the platen 2, as shown in FIG. 6, a lefthand half of the lefthand paper presser roller 3 is pressed against the peripheral surface of the resilient member 21. As a consequence, the pressed portion of the resielient member 21 is resiliently deformed or concaved to a position aligned with the outer peripheral surface of the platen 2. As illustrated in FIG. 7, the portion of the resilient member 21 against which the paper presser roller 3 is not pressed has the initial diameter b and hence the outer periphery of such undeformed portion conceals the teeth 11 in the axial direction of the platen 2. Accordingly, the leading edge of recording paper 7 as inserted from below is guided by the outer peripheral surface of the resilient member 21, without being engaged by the teeth 11, toward a position where the paper presser roller 3 is pressed against the platen 2. Therefore, the leading edge of the recording paper 7 can smoothly be inserted between the platen 2 and the paper presser roller 3 while the paper presser roller 3 is being pressed against the platen 2. The recording paper 7 can thus be loaded with ease.

The loaded recording paper 7 is reliably bit by the teeth 11 and will be fed along in complete synchronism with rotation of the platen 2. The recording paper 7 can therefore be reliably fed along without being subjected to undesirable slippage between the recording paper 7 and the platen 2.

Where the paper feed mechanism is incorporated in a typewriter, the recording paper 7 is sometimes to be positioned immediately after it has been loaded or during recording operation. At this time, the release lever is actuated to displace the paper presser roller 3 out of engagment with the platen 2. Then, as shown in FIG. 5, the resilient member 21 springs back under its own resiliency to its initial diameter b. The recording paper 7 is pushed by the resilient member 21 out of contact with the platen 2, and simultaneously the teeth 11 are disengaged from the recording paper 7, which is then freed for positioning with respect to the platen 2. After the recording paper 7 has been positioned, the paper presser roller 3 is allowed to be pressed against the platen 2 to enable the teeth 11 to bite again into the recording paper 7 to fix the same securely with respect to the platen 2.

Figure 8:
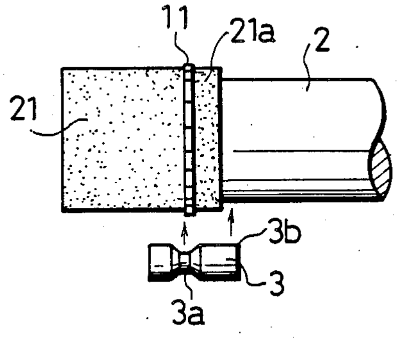
FIGS. 8 and 9 are fragmentary plan view of paper feed mechanisms according to other embodiments of the present invention.

The present invention is in no way limited to the illustrated embodiment, but may be modified in various ways. For example, as shown in FIG. 8, another resilient member 21*a* may be disposed on the platen 2 inside of the teeth 11 remotely from the resilient member 21. A paper presser roller 3 has an elongated inner end 3*b* for abutment against the peripheral surface of the end of the platen 2.

Figure 9:
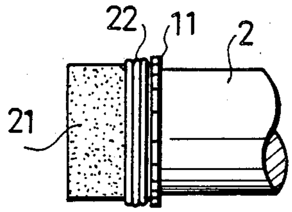

Alternatively, as illustrated in FIG. 9, a coil spring 22 or a ring-shaped spring may be disposed laterally of the teeth 11. The spring 22 may be located independently of or disposed around the outer peripheral surface of the spongy resilient member 21.

The paper feed mechanism of the present invention may be incoporated in various recording apparatus other than the pen recorder, such as a wire-dot printer and a typewriter.

The arrangement of the present invention has the following advantages:

Since the resilient member is disposed adjacent to the teeth and has a diameter larger than that of the platen, the recording paper will be pushed and freed out of engagement with the teeth under the restoring force of the resilient member when the paper presser roller is displaced out of contact with the platen. This is advantageous in positioning recording paper right after it has been loaded such as in a typewriter.

The recording paper is fed along in full synchronism with rotation of the platen since the teeth are held in biting engagement with the recording paper, as with the prior art. Furthermore, the teeth do not interfere with the leading edge of the recording paper as it is loaded for thereby allowing the leading edge to be inserted smoothly between the the platen and the paper presser roller. Accordingly, the recording paper can easily be loaded, and no complex procedure is necessary even if frequent paper replacement is needed as when separate sheets of recording paper are used.

Although certain preferred embodiments have been shown and described, it should be understood that many changes and modifications may be made therein without departing from the scope of the appended claims.

What is claimed is:

1. A paper feed mechanism for use in a recording apparatus, comprising:

(a) a rotatable platen;

(b) a printing unit disposed in confronting relation to said platen and movable axially of said platen for printing on the recording paper against said platen;

(c) a plurality of teeth disposed at each end of said platen and arranged circumferentially of said platen, said teeth having an outer diameter greater than that of said platen;

(d) a resilient member disposed circumferentially, outwardly of and adjacent to said teeth at each end and having an uncompressed diameter of an outer surface thereof greater than that of said platen and equal to or greater than that of said teeth, such that said resilient member can guide a paper wound around said platen without interence from said teeth when said resilient member is in an uncompressed state; and (e) a paper presser roller disposed in confronting relation to said teeth and resilient member and movable retractably toward said platen for pressing the recording paper against said resilient member such that said outer surface of said resilient member is compressed below the diameter of said teeth to provide said teeth in biting engagement with the recording paper, said paper presser roller having a portion for pressing the recording paper against said resilient member.

2. A paper feed machanism according to claim 1, wherein said resilient member has a peripheral portion concealing said teeth in the axial direction of said Platen.

3. A paper feed mechanism according to claim 1, further including a second resilient member disposed adjacent to said teeth remotely from: said first-mentioned resilient member and having a diameter larger than that of said platen.

4. A paper feed mechanism according to claim 1, further including a spring disposed adjacent to said teeth around said resilient member.

5. A paper feed mechanism according to claim 1, wherein said paper presser roller includes a recessed diameter portion opposite said teeth for accomodating said teeth therein when pressed against said platen.

* * * * *